(12) United States Patent
Mu-Tsai

(10) Patent No.: US 6,735,093 B2
(45) Date of Patent: May 11, 2004

(54) COMPUTER SYSTEM AND EMI STRUCTURE THEREOF

(75) Inventor: Chang Mu-Tsai, Taipei Hsien (TW)

(73) Assignees: Wistron Corporation, Hsi-Chih (TW); Acer Incorporated, Hsi-Chih (TW)

(*) Notice: Subject to any disclaimer, the term of this patent is extended or adjusted under 35 U.S.C. 154(b) by 0 days.

(21) Appl. No.: 10/006,218

(22) Filed: Dec. 10, 2001

(65) Prior Publication Data

US 2002/0085363 A1 Jul. 4, 2002

(30) Foreign Application Priority Data

Aug. 12, 2000 (TW) .................................... 089221327 U

(51) Int. Cl.[7] ................................................. H05K 9/00
(52) U.S. Cl. ........................ 361/818; 361/816; 361/800; 361/802; 439/377; 174/35 R
(58) Field of Search ................................. 361/756, 727, 361/741, 686, 802, 818, 816, 800, 797, 714, 724, 796, 799; 439/377; 174/35 R, 51

(56) References Cited

U.S. PATENT DOCUMENTS 5,055,061 A * 10/1991 Lichtenwalter ............. 439/377
5,500,789 A * 3/1996 Miller et al. ................ 361/816
5,777,856 A * 7/1998 Phillips et al. .............. 361/816

* cited by examiner

Primary Examiner—David Martin
Assistant Examiner—Hung Bui
(74) Attorney, Agent, or Firm—Winston Hsu

(57) ABSTRACT

A computer system with an EMI prevention structure includes a housing for covering a main board. The housing has leading grooves formed on two opposite inside surfaces. The main board includes a ground layer formed on the periphery, attached shielding devices corresponding to the leading grooves, a thickness of the main board and a shielding device being substantially equal to a gap formed by a leading groove. Each shielding device has a pair of substantially parallel metal plates and a metal side plate forming an open rectangular channel, the open side allowing the shielding device to fit over the ground layer of the main board. A spring latch is installed on a plate of each shielding device to allow the shielding device to remain firmly fixed to the main board.

10 Claims, 4 Drawing Sheets

COMPUTER SYSTEM AND EMI STRUCTURE THEREOF

BACKGROUND OF THE INVENTION (1) Field of the Invention

The invention relates to an electromagnetic interference (EMI) prevention structure, and more particularly, to an electromagnetic interference prevention structure for a personal computer.

(2) Description of the Prior Art

Many electronic products, especially information products such as personal computers or set-top boxes, comprise metal housings for covering a main board of a computer system, so as to protect the electronic components therein and to reduce EMI for the electronic components. It has been proven that strong EMI generated by an electronic product can cause harm to a human being, especially for electronic devices having high working frequencies. Therefore, a specified security standard to limit the level of EMI from many kinds of the electronic products is applied in many countries.

In a conventional technique, a main board in a metal housing is usually fixed into an inner side or the metal housing by screws so as to reduce the potential between the ground voltage of the main board and voltage of the metal housing. Thus, the EMI generated from the potential can be reduced. Additionally, the conductive surface can be extended because of the contact between the main board and the metal housing so that the energy of the EMI may be decreased.

FIG. 1 shows a main board of a computer system 10 according to the prior art, wherein an upper cover of the housing is removed such that the relationship between a main board 11 and a metal housing 13 is clear. A plurality of through holes 15 are formed on the main board 11 so that the main board 11 can be secured on one surface of the metal housing 13 by screws 12. The lower portion of the screw 12 is tinned and is connected with a ground layer 14 of the main board 11 so as to reduce a potential between a voltage of the main board 11 and a voltage of the metal housing 13. Thus, the EMI generated from the potential can be reduced. Additionally, the conductive surface can be extended because of the contact between the main board 11 and the metal housing 13 so that the energy of the EMI may also be reduced.

However, securing the screws 12 and the metal housing 13 is difficult. Moreover, the screws allow for a gap between the metal housing 13 and the main board 11, the gap permitting electromagnetic waves to easily pass through.

SUMMARY OF THE INVENTION

Accordingly, it is a primary object of the present invention to provide a computer system and an EMI preventing structure thereof.

To achieve the above object the present invention provides a shielding device comprising a pair of substantially parallel metal plates and a metal side plate forming an open rectangular channel, said shielding device connected to a ground layer of a main board by clamping over a periphery thereof, wherein at least one spring piece is installed on at least one of the metal plates for mating with a leading groove of a computer housing.

This object is achieved by the EMI preventing structure described below.

BRIEF DESCRIPTION OF THE DRAWINGS

The present invention will now be specified with reference to its preferred embodiment illustrated in the drawings, in which

FIG. 3 are detail views of the preferred embodiment of the shielding device, wherein FIG. 3(a) is a front view thereof, FIG. 3(b) is a rear view thereof and FIG. 3(c) is side view thereof.

DESCRIPTION OF THE PREFERRED EMBODIMENT

The invention disclosed herein is directed to a shielding device. In the following description, numerous details are set forth in order to provide a thorough understanding of the present invention. It will be appreciated by one skilled in the art that variations of these specific details are possible while still achieving the results of the present invention. Furthermore, well-known components are not described in detail in order not to unnecessarily obscure the present invention.

Figure 1:
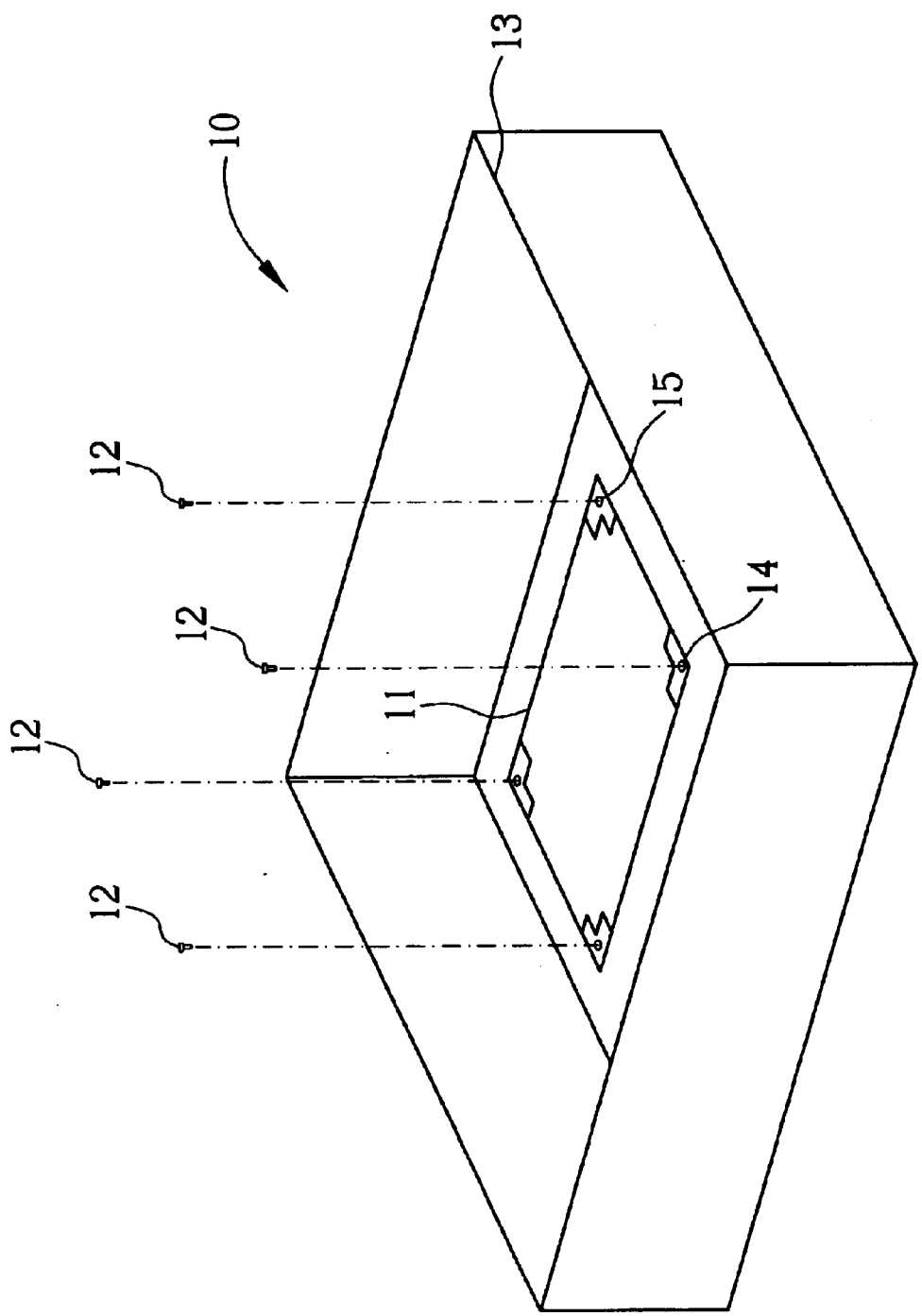
FIG. 1 is a perspective view of a main board and a metal housing in accordance with the conventional technology, showing the connection status wherein an upper cover of the metal housing is removed.
Figure 2:
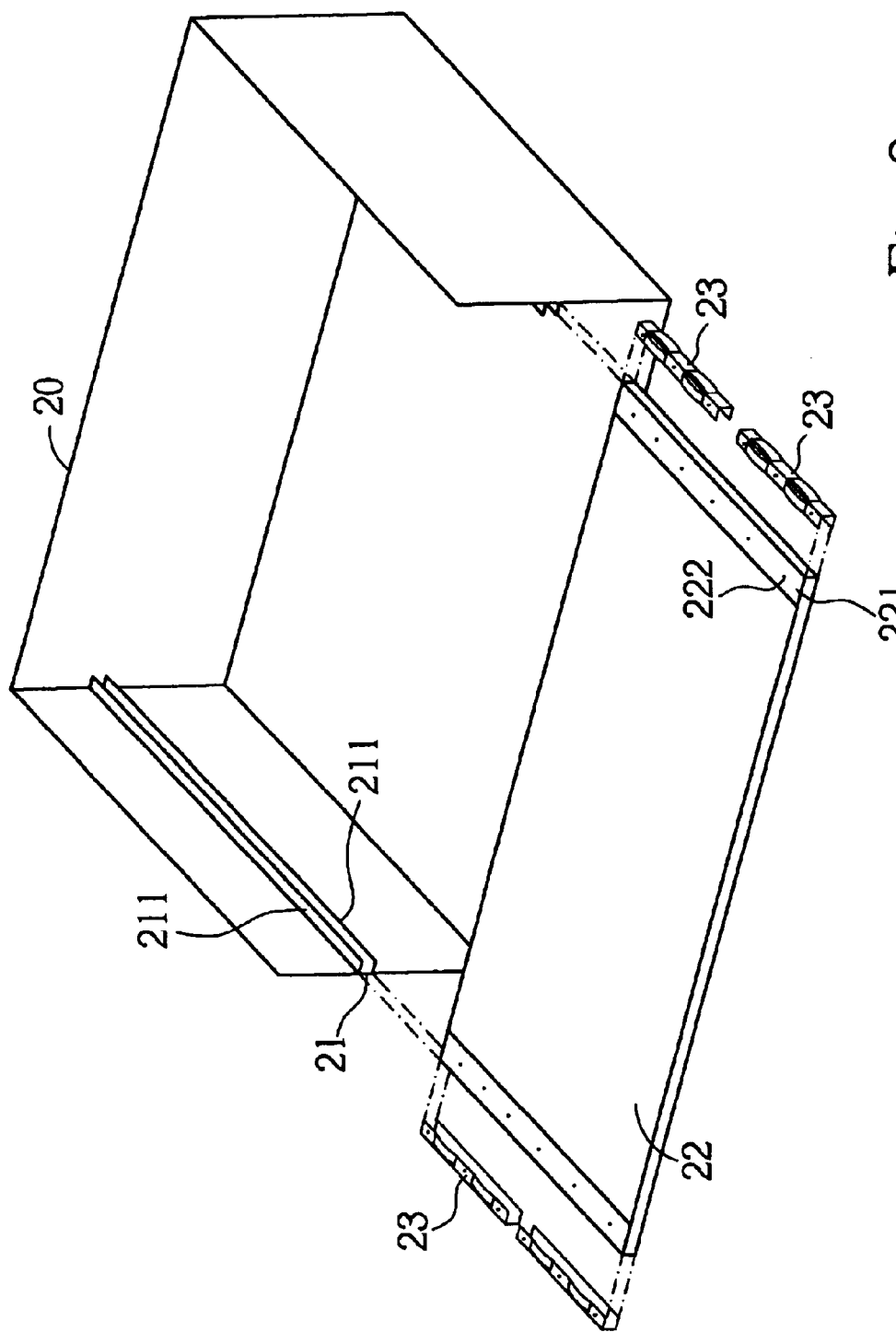
FIG. 2 is a perspective view of a preferred embodiment of a main board, shielding devices, and a metal housing in accordance with the present invention, showing the connection status wherein an upper cover of the metal housing is removed.

Referring now to FIG. 2, a preferred embodiment of the present invention is shown in perspective, in which an upper cover is removed. A computer system comprises: a main board 22, a plurality of shielding devices 23 which are embedded on the periphery of the main board 22, and a metal housing 20 for covering the main board 22. The computer system can be a personal computer, a set-top box, or a PDA. The metal housing 20 is pressed from a metal plate and is formed in a substantially cuboid shape wherein leading grooves 21 are installed on two opposite surfaces. Each leading groove. 21 has a pair of parallel ribs 211, a gap between the ribs 211 being similar to the width of the main board 22 so that the main board 22 can be inserted into the leading grooves 21 to provide a simple assembly procedure for the computer system. In order to reinforce the connection between the main board 22 and the leading grooves 21, the elastic shielding devices 23 are installed on opposite edges of the main board 22 before the main board 22 is inserted into the leading groove 21. Thus, when the main board 22 with the shielding devices 23 attached is inserted into the leading groove 21, the shielding devices 23 fit within the ribs 211 as provided for by the width and thickness of the main board 22 and shielding 23 combined compared to the gap provided by the ribs 211. As a result, the main board 22 can be stably installed within the metal housing 20.

Further referring to FIG. 2, the main board 22 is, in general, a printed circuit board having several electronic components and connectors installed thereon so as to achieve a specific function. As this is well known in the art, detailed descriptions of such electronic components and specific functions are not discussed here. It should be noted that the opposite peripheral sides of the main board 22 are tinned forming ground layers 221. The ground layer 221 is electrically connected with the shielding device 23 so as to make the ground voltage of the main board 22 be equal to the voltage of the metal housing 20. Furthermore, a plurality of through holes 222 are formed on the ground layer 221 such that the shielding devices 23 can be,fixed on these through holes 222.

Figure 3:
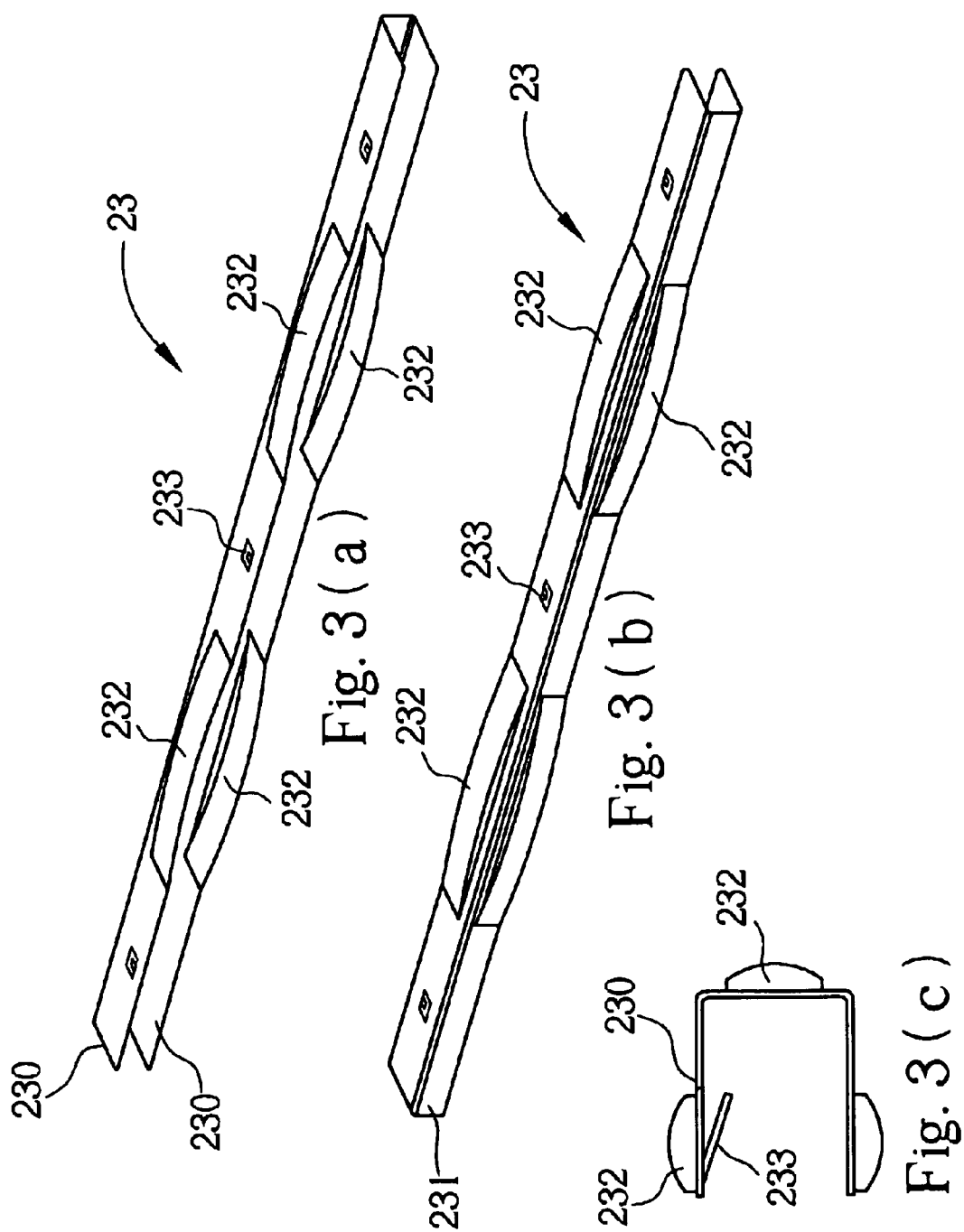

Please refer to FIG. 3 which is a detail view of the preferred embodiment of the shielding device 23, wherein FIG. 3(*a*) is a front view thereof, FIG. 3(*b*) is a rear view thereof, and FIG. 3(*c*) is side view thereof. The shielding device 23 comprises a pair of substantially parallel metal plates 230 and a metal side plate 231 to form a cuboid with an opening. The shielding device 23 is pressed from highly conductive metal such as a copper plate or an aluminum plate. The metal plates 230 and the metal side plate 231 comprise a plurality of spring pieces 232. In the preferred embodiment, a spring latch 233 is formed on the metal plate 230. As shown in the figures, when the spring pieces 232 and the spring latch 233 are manufactured, the shapes of these parts can be directly pressed and formed by a forming machine. Further referring FIG. 3(*c*), the spring pieces 232 protrude outward from the metal plate 230 and the metal side plate 231 so that the width of the shielding device 23 is slightly larger than the gap of the leading groove 21. On the other hand, the spring latch 233 is directed inward So that the spring latch 233 of the shielding device 23 can be secured into the through hole 222 of the main board 22.

Figure 4:
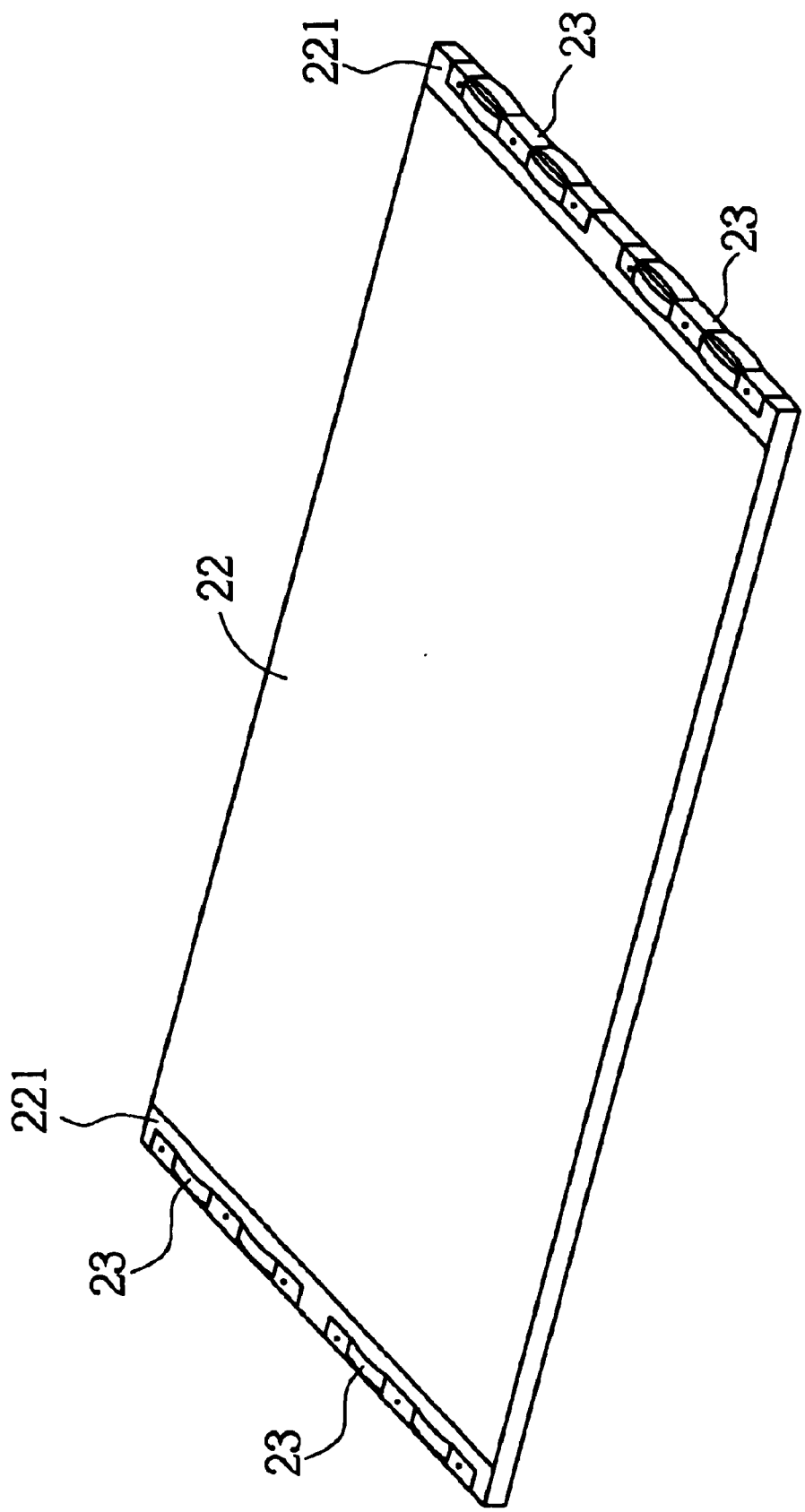
FIG. 4 is a perspective view of the main board and shielding devices of FIG. 2 assembled.

As shown in FIG.4, when installing the main board 22, the opening of the shielding device 23 is aligned with and pushed over the ground layer 221 on the edge of the main board 22. As shown in FIG. 3(*c*), because the spring latch 233 of the metal plate 230 is directed inward so as to form a barb, the spring latch 233 can embed within the through hole 222 of the main board 22 to stably fix the shielding device 23 onto the main board 22. When the main board 22 with the shielding devices 23 is inserted into the leading groove 21, the spring pieces 232 are compressed by the leading groove 21 so the main board 22 is firmly retained within the leading groove 21. Therefore, the electrical connection between main board 22 and the metal housing 20 can be maintained even if the computer is shocked such that EMI can be prevented. Furthermore, the present invention can simplify assembly as the main board 22 can be directly pushed into the leading groove 21.

While the present invention has been particularly shown and described with reference to a preferred embodiments it will be understood by those skilled in the art that various changes in form and detail may be made without departing from the spirit and scope of the present invention.

What is claimed is:

1. A computer system and EMI prevention structure thereof, comprising:
    a housing for covering a computer having a leading groove formed inside thereof;
    a main board having a ground layer formed on the periphery thereof wherein a thickness of the main board is substantially equal to a width of the leading groove; and
    a shielding device comprising a pair of substantially parallel metal plates and a metal side plate forming an open rectangular channel, said shielding device connected to the ground layer of the main board by clamping over the periphery thereof, wherein at least one spring piece is installed on at least one of the metal plates for mating with the leading groove.

2. The computer system and the EMI prevention structure thereof according to claim 1, wherein said shielding device is pressed from a metal plate.

3. The computer system and the EMI prevention structure thereof according to claim 1, wherein the ground layer is a tinned layer formed on the main board.

4. The computer system and the EMI prevention structure thereof according to claim 1, wherein the spring piece is integrally formed with said shielding device.

5. The computer system and the EMI prevention structure thereof according to claim 1, wherein the main board further comprises a plurality of through holes formed on the ground layer.

6. The computer system and the EMI prevention structure thereof according to claim 5, wherein a plurality of spring latches with respect to the through holes are installed on said shielding device.

7. The computer system and the EMI prevention structure thereof according to claim 1, wherein the spring latches are integrally formed with said shielding device.

8. The computer system and the EMI prevention structure thereof according to claim 1, wherein each metal plate comprises at least one spring piece, a spring piece on the metal side plate providing a spring force substantially orthogonal to spring forces of spring pieces on the pair of substantially parallel metal plates to two-dimensionally stabilize the main board in the leading groove.

9. A metal shielding device which is embedded on a main board for preventing EMI, comprising:
    a pair of substantially parallel metal plates connected with a metal side plate forming an open rectangular channel, said shielding device capable of being connected to a ground layer of the main board by clamping over a periphery thereof, wherein each metal plate comprises at least one spring piece, a spring piece on the metal side plate providing a spring force substantially orthogonal to spring forces of spring pieces on the pair of substantially parallel metal plates.

10. The metal shielding device according to claim 9, wherein the spring piece is integrally formed with said shielding device.

* * * * *